US011553305B2

(12) United States Patent
Du et al.

(10) Patent No.: US 11,553,305 B2
(45) Date of Patent: *Jan. 10, 2023

(54) METHOD OF AND APPARATUS FOR ACCESS GEOGRAPHICAL LOCATION INFORMATION SERVICE

(71) Applicant: THALES DIS FRANCE SAS, Meudon (FR)

(72) Inventors: Hongfei Du, Meudon (FR); Yu Chen, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,177

(22) Filed: Mar. 8, 2018

(65) Prior Publication Data

US 2018/0199151 A1     Jul. 12, 2018

Related U.S. Application Data

(63) Continuation of application No. 13/576,069, filed as application No. PCT/CN2010/070518 on Feb. 24, 2010, now Pat. No. 9,949,066.

(51) Int. Cl.
    *H04W 4/02*     (2018.01)
    *H04W 4/029*    (2018.01)
    (Continued)

(52) U.S. Cl.
    CPC ......... *H04W 4/029* (2018.02); *H04L 67/1021* (2013.01); *H04W 4/021* (2013.01); *H04W 4/70* (2018.02)

(58) Field of Classification Search
    CPC .... H04L 67/1021; H04W 4/02; H04W 4/021; H04W 4/70; H04W 40/20; H04W 4/025;
    (Continued)

(56) References Cited

U.S. PATENT DOCUMENTS 6,091,959 A     7/2000  Souissi et al.
2003/0191753 A1  10/2003  Hoch
(Continued)

FOREIGN PATENT DOCUMENTS

CN      1538638 A    10/2004
CN    101415187 A     4/2009
(Continued)

OTHER PUBLICATIONS

"Discussion on Content-based Access Procedure for MTC," 3GPP T5G SA WG2 Meeting #77, TD S2-100162, Jan. 18-22, 2010, Shenzhen, China, Source: Alcatel-Lucent Shanghai Bell, Alcatel-Lucent, Document for: Discussion and Decision, Agenda Item: 9.7, Work Item/Release: NIMTC / Release 10.

*Primary Examiner* — Quoc Thai N Vu
(74) *Attorney, Agent, or Firm* — Marc Boillot—Thales DIS CPL USA, Inc

(57) ABSTRACT

The invention provides a solution to accessing for a geographical location information-based service in a server of a machine type communication based communication system, where firstly a server broadcasts or multicasts a content request message, the content request message comprising information on requested content and information on a target geographical location; then the server receives a response message from at least one user equipment, the response message indicating that the at least one user equipment possesses the requested content and the at least one user equipment being located within the target geographical location; and finally the server acquires the requested content from the at least one user equipment.

8 Claims, 6 Drawing Sheets

(51) Int. Cl.
*H04W 4/021* (2018.01)
*H04L 67/1021* (2022.01)
*H04W 4/70* (2018.01)

(58) Field of Classification Search
CPC ............... H04W 4/029; H04N 21/472; H04N 21/47202
See application file for complete search history.

(56) References Cited

U.S. PATENT DOCUMENTS

| | | |
|---|---|---|
| 2006/0271661 A1 | 11/2006 | Qi et al. |
| 2007/0270161 A1 | 11/2007 | Hampel et al. |
| 2008/0248821 A1 | 10/2008 | Kim |
| 2009/0063419 A1 | 3/2009 | Nurminen et al. |
| 2009/0148124 A1 | 6/2009 | Athsani et al. |
| 2009/0204672 A1 | 8/2009 | Jetha et al. |
| 2009/0210933 A1 * | 8/2009 | Shear ................. G06Q 30/06 726/6 |
| 2009/0238112 A1 | 9/2009 | Hong et al. |
| 2010/0097989 A1 * | 4/2010 | Huang .................. H04W 4/02 370/328 |
| 2010/0146055 A1 | 6/2010 | Hannuksela |
| 2010/0205435 A1 | 8/2010 | Xie |

FOREIGN PATENT DOCUMENTS

| | | |
|---|---|---|
| CN | 101449599 | 6/2009 |
| JP | 2007-74449 | 3/2007 |
| JP | 2008-16988 | 1/2008 |
| KR | 2008-0104405 A | 12/2008 |
| WO | 99/52316 A1 | 10/1999 |

* cited by examiner

METHOD OF AND APPARATUS FOR ACCESS GEOGRAPHICAL LOCATION INFORMATION SERVICE

This application is a continuation of application Ser. No. 13/576,069, filed Jul. 30, 2012, which is a 371 national phase of PCT/CN2010/070518, filed Feb. 4, 2010, and published on Aug. 11, 2011 as WO 2011/094939 A1.

FIELD OF THE INVENTION

The present disclosure relates to a method of and an apparatus for accessing for machine type communication.

BACKGROUND OF THE INVENTION

Machine to Machine (M2M) refers to transmission of data from one terminal to another terminal or exchange of data between machines through GSM/GPRS, UMTS/HSDPA and CDMA/EVDO or other modules. At present, M2M is generally applied in the fields of security surveillance, automatic vending machines, public traffic systems, vehicle monitoring and management, industry process automatization, motor machineries, city informationalization, etc.

At present a positioning function is offered in the 3GPP specification to determine channel condition information of a user equipment, but the existing positioning function can not be applied in a machine type communication based communication system because the current implementation of a geographical location-based service requires an additional location server which handles the geographical location information. Thus the geographical location information can not be used directly by a machine type communication server, and the geographical location information acquired by 3GPP mobility control, which is information at a cell level, is not accurate enough.

Among the system optimization categories defined in the 3GPP specification, machine type communication involves heterogeneous applications due to its extensive support of a variety of network topology environments. Thus in a machine type communication based communication system, a user equipment may be completely stationary, and additional signaling is required to optimize the mobility management of machine type communication.

SUMMARY OF THE INVENTION

For a machine to machine application, the invention defines a new system optimization category referred to as geographical location information based machine type communication identification. Machine type communication devices often spread over wide remote geographical area, and their geographical location information is an important parameter to be reported together with their own content, e.g., measured data, etc., to the server. In other words, there exists a one-to-one correspondence between the content and the geographical location information in a machine type communication system. The identifications of the machine type communication devices do not rely on cell level location identification but on geographical location information at a more precise level. A machine type communication device would be considered as geographical location information-based device, if it is addressed by its geographical location information and its data transmission is solely identified by its geographical location information rather than being identified by the name of the device itself.

In a technical solution to machine type communication identification based upon geographical location information according to the invention, a server addresses a device by its geographical location information instead of a device identifier. The device is addressed by its geographical location information, and the server defines and recognizes the geographical location area information as a unique identification within the same communication network.

According to an embodiment of the invention, there is provided a method of accessing for a geographical location information-based service in a server of a machine type communication based communication system. The method comprises the steps of: broadcasting or multicasting a content request message, the content request message including information on requested content and information on a target geographical location; receiving a response message from at least one user equipment, the response message indicating that the at least one user equipment possesses the requested content, and the at least one user equipment being located within the target geographical location; and acquiring the requested content from the at least one user equipment.

In an embodiment, the server selects at least one user equipment from the at least one user equipment based upon a predetermined rule; and acquires the requested content from the selected at least one user equipment In an embodiment, the server acquires the requested content by establishing a connection with the at least one user equipment.

According to another embodiment of the invention, there is provided a method of accessing for a geographical location information-based service in a user equipment of a machine type communication based communication system. The method comprises the steps of: receiving a content request message from a server, the content request message comprising information on requested content and information on a target geographical location; determining whether the user equipment is located within the target geographical location and determining whether the user equipment possesses the requested content; and sending a response message to the server, if the user equipment is located within the target geographical location and possesses the requested content, the response message including information indicating that the user equipment possesses the content requested by the server. Optionally the response message further comprises information indicating GPS coordinates of the geographical location where the user equipment is located.

According to another embodiment of the invention, there is provided a first accessing apparatus for a geographical location information-based service in a server of a machine type communication based communication system. The apparatus comprises: a broadcasting or multicasting device, for broadcasting or multicasting a content request message, the content request message including information on requested content and information on a target geographical location; a first receiving device, for receiving a response message from at least one user equipment, the response message indicating that the at least one user equipment possesses the requested content, and the at least one user equipment being located within the target geographical location; and an acquiring device, for acquiring the requested content from the at least one user equipment.

According to another embodiment of the invention, there is provided a second accessing apparatus for a geographical location information-based service in a user equipment of a machine type communication based communication system. The apparatus comprises: a second receiving device, for receiving a content request message from a server, the content request message including information on requested content and information on a target geographical location; a determining device, for determining whether the user equipment is located within the target geographical location and determining whether the user equipment possesses the requested content; and a sending device, for sending a response message to the server, if the user equipment is located within the target geographical location and possesses the requested content, the response message including information indicating that the user equipment possesses the content requested by the server.

With the methods and apparatuses of the invention, a machine type communication based communication system is provided with an effective solution of accessing for a location information-based service to thereby greatly improve the capability of the machine type communication based communication system to apply the service for geographical location information-based machine type communication, and the methods and apparatuses of the invention can be applied to various machine type communication based communication systems.

BRIEF DESCRIPTION OF DRAWINGS

Other features, objects and advantages of the invention will become more apparent from the following detailed description of non-limiting embodiments with reference to the drawings in which.

Identical or similar reference numerals denote identical or similar step features or devices (modules).

DETAILED DESCRIPTION OF EMBODIMENTS

The embodiments of the invention will be illustratively detailed below with reference to the drawings.

Figure 1:
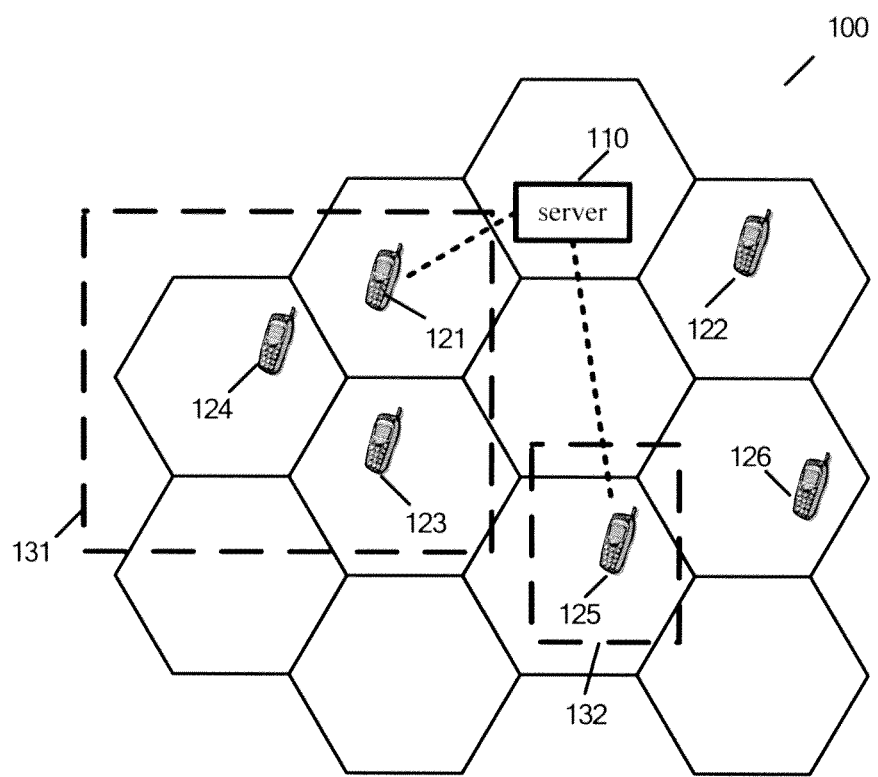
FIG. 1 is a diagram of an application scenario of a machine type communication based communication system 100 according to an embodiment of the invention.

FIG. 1 is a diagram of an application scenario of a machine type communication based communication system 100 according to an embodiment of the invention. In the application scenario illustrated in FIG. 1, the machine type communication based communication system 100 comprises a server 110 and a plurality of user equipments 121, 122, 123, 124, 125 and 126. In an embodiment, one or more other network devices, e.g., a base station or a switch (not illustrated in FIG. 1 for the sake of conciseness), responsible for forwarding the data and the signaling between the server 110 and the plurality of user equipments, can be further included between the server 110 and the plurality of user equipments.

Figure 2:
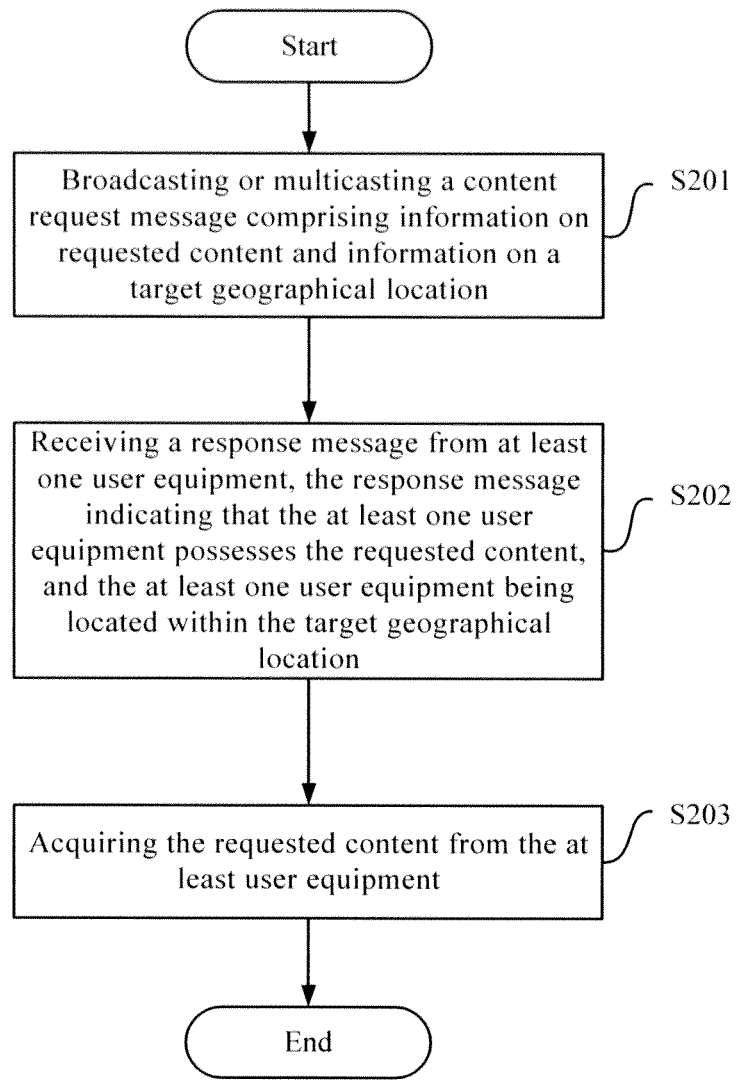
FIG. 2 is a flow chart of a method of accessing for a geographical location information-based service in a server of a machine type communication based communication system according to an embodiment of the invention.

FIG. 2 is a flowchart of a method of accessing for a geographical location information-based service in a server of a machine type communication based communication system according to an embodiment of the invention, and the flow illustrated in FIG. 2 will be described below in detail with reference to FIG. 1.

Firstly in the step S201, the server 110 broadcasts or multicasts a content request message comprising information on requested content and information on a target geographical location.

It shall be noted that the target geographical location can be one or more geographical location points or one or more geographical areas; and the corresponding information on the target geographical location can be GPS coordinate values of the one or more geographical location points or GPS coordinate values of the one or more geographical areas. The content requested by the server 110 can be various content, e.g., a segment of video, a segment of audio, measured values of parameters, status values, etc.

Taking the application scenario illustrated in FIG. 1 as an example without loss of generality, the content request message broadcasted by the server 110 comprises a request for content of a specific video in a user equipment located in a geographical area 131.

In an embodiment, each user equipment firstly determines whether it is located within the target geographical location described in the content request message upon reception of the request message. The user equipments determine whether they are located within the target geographical location according to information on geographical locations where they are located. If the user equipments are mobile terminals, then they can determine whether they are located within the target geographical location according to GPS coordinates measured by their own GPS modules. If the user equipments are fixed user equipments, then their geographical location information can be pre-stored.

As illustrated in FIG. 1, the user equipments 122, 125 and 126 are not in the geographical area 131, so the user equipments 122, 125 and 126 will not perform any process upon reception of the content request message. The user equipments 121, 123 and 124 are located in the geographical area 131, so the user equipments 121, 123 and 124 further determine whether they possess the content of the video requested by the server 110.

Without loss of generality, the user equipments 121 and 123 possess the content of the video requested by the server 110, and then both of the user equipments 121 and 123 send a response message to the server 110. The response message sent by the user equipment 121 includes information indicating that the user equipment 121 possesses the content requested by the server 110, and the response message sent by the user equipment 123 includes information indicating that the user equipment 123 possesses the content requested by the server 110.

Referring back to FIG. 2, in the step S202, the server 110 receives a response message from at least one user equipment, the response message indicating that the at least one user equipment possesses the content requested by the server 110, and the at least one user equipment being located within the target geographical location.

Finally in the step S203, the server 110 acquires the requested content from the at least one user equipment. Specifically how to transmit the content requested by the server 110 between the at least user equipment and the server 110 is determined by the specific network structure and the protocol that is applied. In an embodiment, in the case that the user equipment is a mobile terminal, the user equipment establishes a connection with the server and thus transmits the content to the server 110. In another embodiment, there is no need to establish a connection between the server 110 and the user equipment, and the server 110 sends a request message directly to the user equipment, and then the user equipment transmits the content requested by the server 110 to the server 110.

Optionally, as described previously, in the step S202, if the server 110 receives response messages from the user equipments 121 and 123, then the server 110 can further select one of the user equipments 121 and 123 according to a predetermined rule to acquire the requested content of the video.

It shall be noted that the predetermined rule can vary with the variation of the practical machine type communication based communication systems. For example, one of the user equipments can be selected according to a quality of a radio link when the user equipments access the machine type communication based communication system in a wireless manner. One of the user equipments can be selected according to a bandwidth of a wired link when the user equipments access the machine type communication based communication system in a wired way. In a further example, in an application scenario of scheduling taxies, the user equipments are taxies, and the predetermined rule can be a taxi within the target geographical location closest to a tenant.

It shall be further noted that in some application scenarios, the server 110 doesn't need to select any user equipment but acquire the requested content from each user equipment from which it receives a response message. For example, in an application scenario of remote meter reading, the user equipments are ammeters, and the server 110 will acquire a reading of each ammeter in a specific geographical area.

In some situations, during the transmission of the content requested by the server 110 to the server 110, one or more selected user equipments responsible for the transmission may have moved out of the target geographical location, and then the server 110 will receive a notification message from the one or more user equipments, the notification message notifying the server 110 that the selected at least one user equipment has moved out of the target geographical location.

In an embodiment, in the case that the server 110 establishes a connection with the at least one user equipment, e.g., the user equipment 121, to acquire the content requested by the server 110, the server 110 releases the connection with the user equipment 121 upon reception of the notification message from the user equipment 121.

Next the server 110 repeats the steps S201 to S203 illustrated in FIG. 2 to acquire the requested content from another user equipment within the target geographical location.

An order of the step of releasing the connection and the repeated steps of S201 to S203 may be slightly different according to different properties of the content requested by the server 110.

In an embodiment, in the case that the transmission of the content requested by the server 110 can not be interrupted, the server 110 firstly repeats the steps S201 to S203 and then releases the connection with the user equipment 121 upon reception of the notification message. In the case that the transmission of the content may be interrupted, the server 110 can firstly perform the step of releasing the connection to thereby firstly release the connection with the user equipment 121 and then repeat the steps S201 to S203. Of course, alternatively in this case, it can firstly repeat the steps S201 to S203 and then release the connection with the user equipment 121.

Optionally before the step S201 illustrated in FIG. 2, the server 110 can further receive the content request message from a network device, the content request message comprising the information on the target geographical location and the information on the requested content. The server 110 further performs the steps S201 to S203 after receiving the content request message. Then it sends the content acquired in the step S203 to the network device. It shall be noted that the network device can be any device capable of communicating with the server 110, e.g., a user equipment or another server.

It shall be noted that if the server 110 does not receive any response message after performing the step S201 as illustrated in FIG. 2 once, then it can expand the range of the target geographical location and perform the flow as illustrated in FIG. 2 again.

The flow of the method of accessing for a geographical location information-based service has been described above from the perspective of the server 110.

Figure 3:
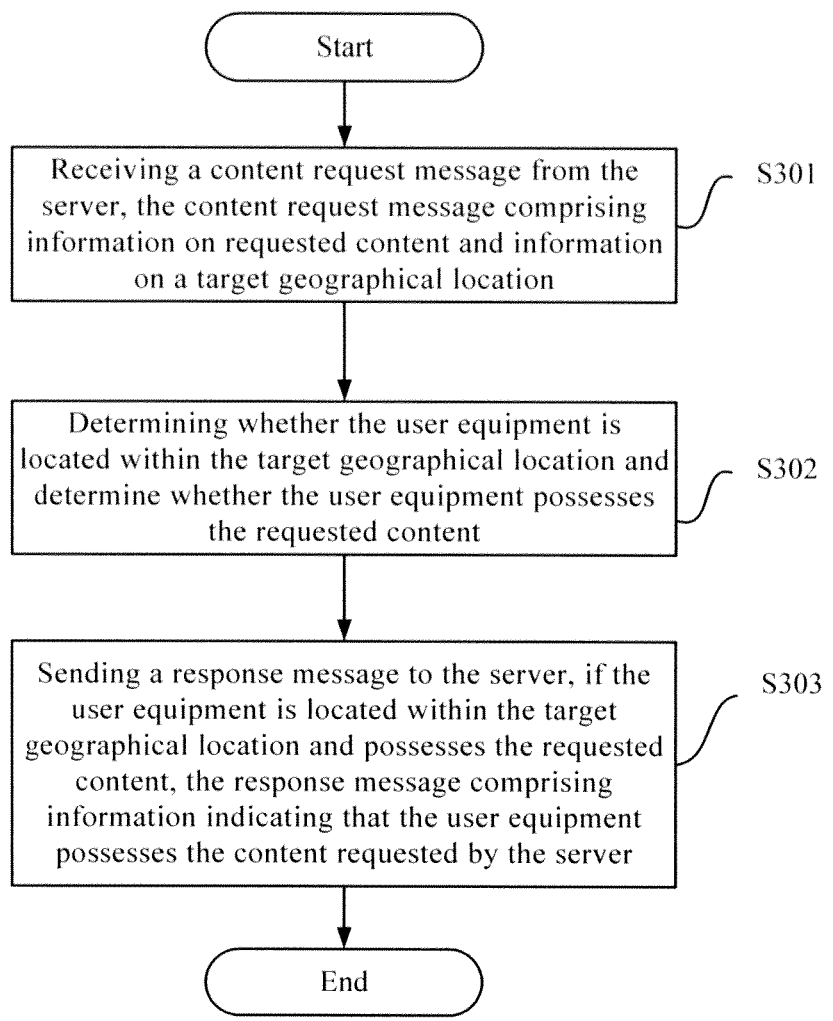
FIG. 3 is a flow chart of a method of accessing for a geographical location information-based service in a user equipment of a machine type communication based communication system according to an embodiment of the invention.

FIG. 3 is a flow chart of a method of accessing for a geographical location information-based service in a user equipment of a machine type communication based communication system according to an embodiment of the invention, and the flow illustrated in FIG. 3 will be described below in detail in connection with FIG. 1 taking the user equipment 121 as an example.

Firstly in the step S301, the user equipment 121 receives a content request message from the server 110, the content request message comprising information on requested content and information on a target geographical location.

Next in the step S302, the user equipment 121 determines whether it is located within the target geographical location and determines whether it possesses the content requested by the server 110.

Finally in the step S303, if the user equipment 121 is located within the target geographical location, e.g., the geographical area 131 illustrated in FIG. 1, and possesses the content requested by the server 110, then it sends a response message to the server 110, the response message comprising information indicating that the user equipment 121 possesses the content requested by the server 110. In an embodiment, the response message further comprises information indicating GPS coordinates of the geographical location where the user equipment 121 is located. In this case, the user equipment 121 is provided therein with a GPS module configured to acquire the GPS coordinates of the geographical location where the user equipment 121 is located.

If the server 110 selects the user equipment 121 to acquire the requested content, then the user equipment 121 transmits the content requested by the server 110 to the server 110. Specifically how to transmit the content requested by the server 110 between the user equipment 121 and the server 110 is determined by the specific network structure and the protocol that is applied. In an embodiment, in the case that the user equipment 121 is a mobile terminal, the user equipment 121 establishes a connection with the server 110 and thus transmits the content to the server 110.

In the case that the user equipment 121 is a mobile terminal, it may have moved out of the target geographical location before the transmission of the content requested by the server 110 is completed, and then the user equipment 121 sends a notification message to the server 110 to notify the server 110 that the user equipment 121 has moved out of the target geographical location. The user equipment 121 can determine whether it is going to moved out of the target geographical location by comparing the GPS coordinate values measured by its GPS module with the target geographical location.

The user equipment 121 can send the notification message at different time points according to different properties of the content requested by the server 110. In an embodiment, in the case that the transmission of the content can not be interrupted, the user equipment 121 needs to send the notification message before moving out of the target geographical location so that the server 110 can acquire the content in a timely way from another user equipment within the target geographical location. In an embodiment, in the case that the transmission of the content may be interrupted, the user equipment 121 can send the notification message when or after moving out of the target geographical location. Of course, alternatively in this case, the user equipment 121 can send the notification message before moving out of the target geographical location.

The flow of the method of accessing for a geographical location information-based service in a user equipment of a machine type communication based communication system has been described above from the perspective of the user equipment.

Figure 4:
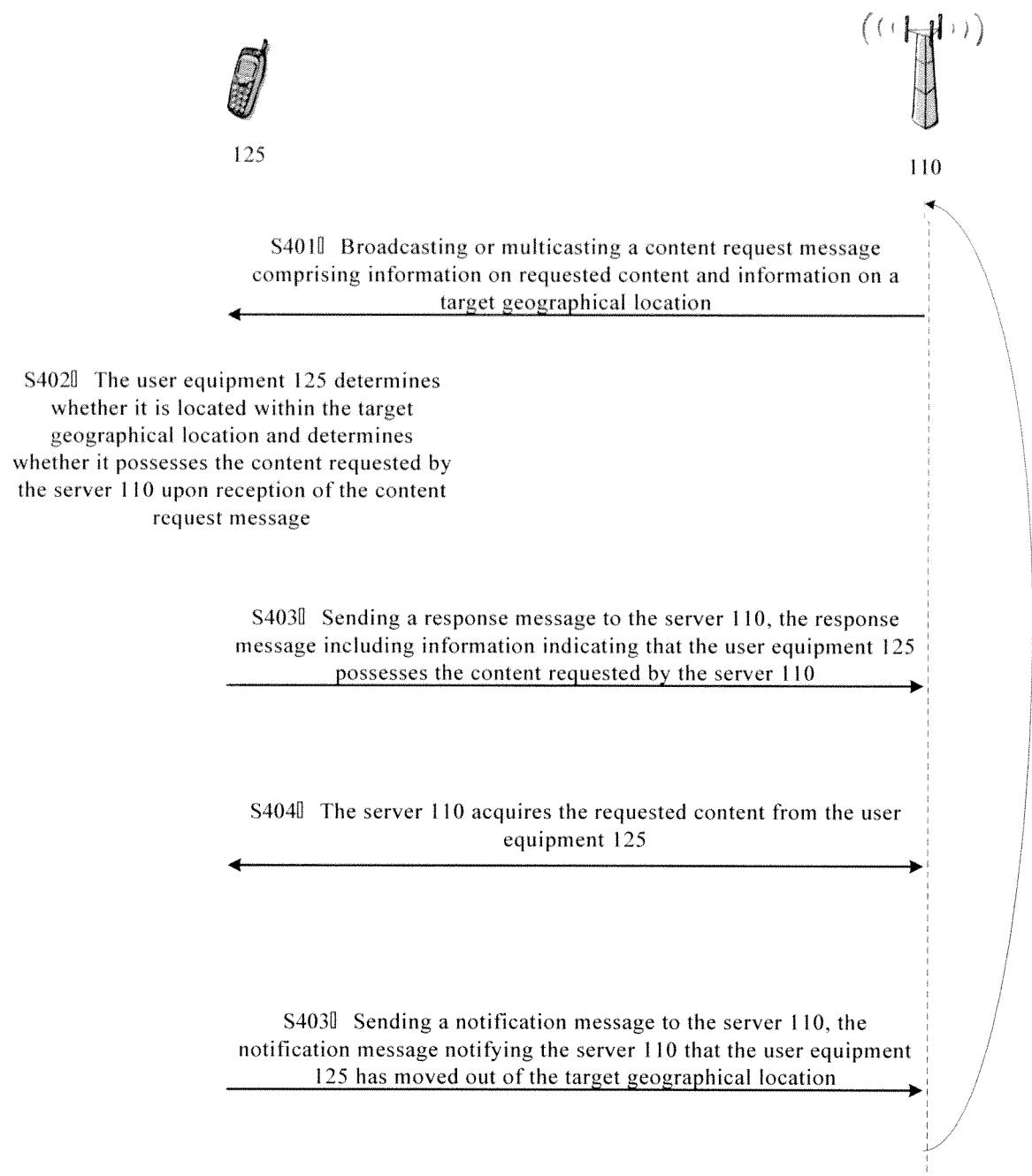
FIG. 4 is a flow chart of a method of accessing for a geographical location information-based service in a machine type communication based communication system according to an embodiment of the invention.

FIG. 4 illustrates a flow chart of a method of accessing for a geographical location information-based service in a machine type communication based communication system according to an embodiment of the invention, and the flow illustrated in FIG. 4 will be described below in detail in connection with FIG. 1.

Firstly in the step S401, the server 110 broadcasts or multicasts a content request message comprising information on requested content and information on a target geographical location. Without loss of generality, the information on the target geographical location in the content request message is the geographical area 132 illustrated in FIG. 1, and the requested content are content of a video of an environment within the target geographical location in a certain time period.

Next in the step S402, the user equipment 125 determines whether it is located within the target geographical location and determines whether it possesses the content requested by the server 110 upon the reception of the content request message. If the user equipment 125 is a mobile terminal, then it determines whether it is located within the target geographical location according to GPS coordinate values measured by its GPS module; and if the user equipment 125 is a fixed device, then it can acquire its geographical location information in advance, e.g., GPS values of a geographical location where it is located.

As illustrated in FIG. 1, since the user equipment 125 is located within the target geographical location, i.e., in the geographical area 132, and the user equipment is provided with a camera module to take and store a video of its surroundings in real time. Thus in the step S403, the user equipment 125 sends a response message to the server 110, the response message comprising information indicating that the user equipment 125 possesses the content requested by the server 110.

Next in the step S404, the server 110 acquires the requested content from the user equipment 125.

Optionally while the server 110 is acquiring a video of the surroundings, if the user equipment 125 is moving out of the geographical area 132, then in the step S405, the user equipment 125 sends a notification message to the server 110 to notify the server 110 that the user equipment 125 is moving out of the target geographical location.

The server 110 repeats the steps S401 to S404 upon reception of the notification message to acquire the requested video of the surroundings.

Figure 5:
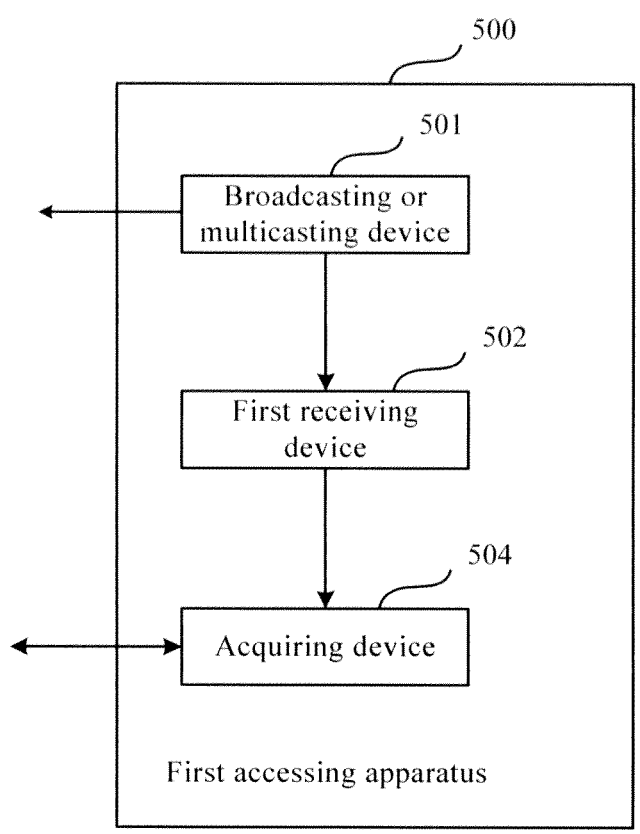
FIG. 5 is a schematic structural diagram of a first accessing apparatus 500 for a geographical location information-based service in a server of a machine type communication based communication system according to an embodiment of the invention.

FIG. 5 is a schematic structural diagram of a first accessing apparatus 500 for a geographical location information-based service in a server of a machine type communication based communication system according to an embodiment of the invention. In FIG. 5, the first accessing apparatus 500 comprises a broadcasting or multicasting device 501, a first receiving device 502 and an acquiring device 503.

An operation process of the first accessing apparatus 500 located in the server 110 will be described below in detail in connection with FIG. 1.

Firstly the broadcasting or multicasting device 501 broadcasts or multicasts a content request message comprising information on requested content and information on a target geographical location.

It shall be noted that the target geographical location can be one or more geographical location points or one or more geographical areas; and the corresponding information on the target geographical location can be GPS coordinate values of the one or more geographical location points or GPS coordinate values of the one or more geographical areas. The content requested by the server 110 can be various kinds of content, e.g., a segment of video, a segment of audio, measured values of parameters, status values, etc.

Taking the application scenario illustrated in FIG. 1 as an example without loss of generality, the content request message broadcasted by the broadcasting or multicasting device 501 comprises a request for content of a specific video in a user equipment located in the geographical area 131.

In an embodiment, each user equipments firstly determines whether it is located within the target geographical location described in the content request message upon reception of the request message. The user equipments determine whether they are located within the target geographical location according to information on geographical locations where they are located. If the user equipments are mobile terminals, then they can determine whether they are located within the target geographical location according to GPS coordinates measured by their own GPS modules. If the user equipments are fixed user equipments, then their geographical location information can be pre-stored.

As illustrated in FIG. 1, the user equipments 122, 125 and 126 are not in the geographical area 131, so the user equipments 122, 125 and 126 will not perform any process upon reception of the content request message. The user equipments 121, 123 and 124 are located in the geographical area 131, so the user equipments 121, 123 and 124 further determine whether they possess the content of the video requested by the server 110.

Without loss of generality, the user equipments 121 and 123 possess the content of the video requested by the server 110, and then both of the user equipments 121 and 123 send a response message to the server 110. The response message sent by the user equipment 121 includes information indicating that the user equipment 121 possesses the content requested by the server 110, and the response message sent by the user equipment 123 includes information indicating that the user equipment 123 possesses the content requested by the server 110.

The first receiving device 502 receives a response message from at least one user equipment, the response message indicating that the at least one user equipment possesses the content requested by the server 110, and the at least one user equipment being located within the target geographical location.

Finally the acquiring device 503 acquires the requested content from the at least one user equipment. Specifically how to transmit the content requested by the server 110 between the at least user equipment and the server 110 is determined by the specific network structure and the protocol that is applied. In an embodiment, in the case that the user equipment is a mobile terminal, the user equipment establishes a connection with the acquiring device 503 and thus transmits the content to the server 110.

Optionally, as described previously, the first receiving device 502 receives response messages from the user equipments 121 and 123, and then the acquiring device 503 can further select one of the user equipments 121 and 123 according to a predetermined rule to acquire the requested content of the video.

It shall be noted that the predetermined rule can vary with the variation of the practical machine type communication based communication systems. For example, one of the user equipments can be selected according to a quality of a radio link when the user equipments access the machine type communication based communication system in a wireless manner. One of the user equipments can be selected according to a bandwidth of a wired link when the user equipments access the machine type communication based communication system in a wired way. In a further example, in an application scenario of scheduling taxies, the user equipments are taxies, and the predetermined rule can be a taxi within the target geographical location closest to a tenant.

It shall be further noted that in some application scenarios, the acquiring device 503 doesn't need to select any user equipment but acquire the requested content from each user equipment from which the first receiving device 502 receives a response message. For example, in an application scenario of remote meter reading, the user equipments are ammeters, and the server 110 will acquire a reading of each ammeter in a specific geographical area.

In some situations, during the transmission of the content requested by the server 110 to the server 110, one or more selected user equipments responsible for the transmission may have moved out of the target geographical location, and then the first receiving device 502 will receive a notification message from the one or more user equipments, the notification message notifying the server 110 that the selected at least one user equipment has moved out of the target geographical location. In this case, the first accessing apparatus 500 further a controlling device (not illustrated in FIG. 5)

In an embodiment, in the case that the acquiring device 503 establishes a connection with the at least one user equipment, e.g., the user equipment 121, to acquire the content requested by the server 110, the acquiring device 503 releases the connection with the user equipment 121 after the first receiving device 502 receives the notification message from the user equipment 121.

Next the controlling device controls the broadcasting or multicasting device 501, the first receiving device 502 and the acquiring device 503 to repeat the foregoing step of broadcasting or multicasting, step of receiving the response message and step of acquiring the content respectively to acquire the requested content from another user equipment within the target geographical location.

An order of the step of the acquiring device 503 releasing the connection and the broadcasting or multicasting device 501, the first receiving device 502 and the acquiring device 503 repeating the foregoing step of broadcasting or multicasting, step of receiving the response message and step of acquiring the content respectively may be slightly different according to different properties of the content requested by the server 110.

In an embodiment, in the case that the transmission of the content requested by the server 110 can not be interrupted, after the first receiving device 502 receives the notification message, the controlling device firstly controls the broadcasting or multicasting device 501, the first receiving device 502 and the acquiring device 503 to repeat the foregoing step of broadcasting or multicasting, step of receiving the response message and step of acquiring the content respectively and then controls the acquiring device 503 to release the connection with the user equipment 121. In the case that the transmission of the content may be interrupted, the controlling device controls the acquiring device 503 to firstly perform the step of releasing the connection to thereby firstly release the connection with the user equipment 121, and then the controlling device controls the broadcasting or multicasting device 501, the first receiving device 502 and the acquiring device 503 to repeat the foregoing step of broadcasting or multicasting, step of receiving the response message and step of acquiring the content respectively. Of course, alternatively in this case, the controlling device can firstly control the broadcasting or multicasting device 501, the first receiving device 502 and the acquiring device 503 to repeat the foregoing step of broadcasting or multicasting, step of receiving the response message and step of acquiring the content respectively and then control the acquiring device 503 to release the connection with the user equipment 121.

Optionally before the broadcasting or multicasting device 501 performs broadcasting or multicasting, the first receiving device 502 can further receive the content request message from a network device, the content request message comprising the information on the target geographical location and the information on the requested content. At last the acquiring device 503 sends the acquired content to the network device. It shall be noted that the network device can be any device capable of communicating with the server 110, e.g., a user equipment or another server.

It shall be noted that if the first receiving device 502 does not receive any response message after the broadcasting or multicasting device 501 broadcasts or multicasts the content request message, then the controlling device can expand the range of the target geographical location and then control the broadcasting or multicasting device 501 to broadcast or multicast the content request message again.

Figure 6:
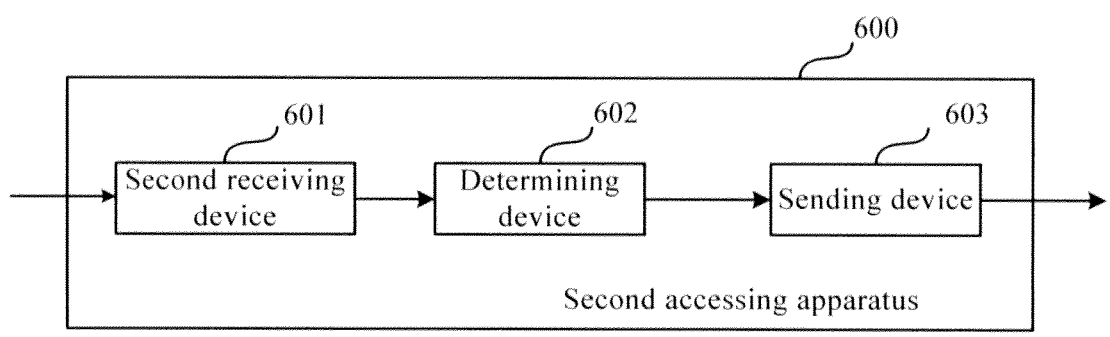
FIG. 6 is a schematic structural diagram of a second accessing apparatus 600 for a geographical location information-based service in a user equipment of a machine type communication based communication system according to an embodiment of the invention.

FIG. 6 is a schematic structural diagram of a second accessing apparatus 600 for a geographical location information-based service in a user equipment of a machine type communication based communication system according to an embodiment of the invention. In FIG. 6, the second apparatus 600 comprises a second receiving device 601, a determining device 602 and a sending device 603.

An operation process of the second accessing apparatus 600 located in the user equipment 121 will be described below in detail in connection with FIG. 1.

Firstly the second receiving device 601 receives a content request message from the server 110, the content request message comprising information on requested content and information on a target geographical location.

Next the determining device 602 determines whether the user equipment is located within the target geographical location and determines whether the user equipment possesses the content requested by the server 110.

Finally if the user equipment 121 is located within the target geographical location, e.g., the geographical area 131 illustrated in FIG. 1, and possesses the content requested by the server 110, then the sending device 603 sends a response message to the server 110, the response message comprising information indicating that the user equipment 121 possesses the content requested by the server 110. In an embodiment, the response message further comprises information indicating GPS coordinates of the geographical location where the user equipment 121 is located. In this case, the user equipment 121 is provided therein with a GPS module configured to acquire the GPS coordinates of the geographical location where the user equipment 121 is located.

If the server 110 selects the user equipment 121 to acquire the requested content, then optionally the user equipment 121 further comprises therein a transmitting device (not illustrated in FIG. 6) configured to transmit the content requested by the server 110 to the server 110. Specifically how to transmit the content requested by the server 110 between the transmitting device and the server 110 is determined by the specific network structure and the protocol that is applied. In an embodiment, in the case that the user equipment 121 is a mobile terminal, the transmitting device establishes a connection with the server 110 and thus transmits the content to the server 110.

In the case that the user equipment 121 is a mobile terminal, it may have moved out of the target geographical location before the transmission of the content requested by the server 110 is completed, and then the sending device 603 sends a notification message to the server 110 to notify the server 110 that the user equipment 121 has moved out of the target geographical location. The user equipment 121 can determine whether it is going to move out of the target geographical location by comparing the GPS coordinate values measured by its GPS module with the target geographical location.

The sending device 603 can send the notification message at different time points according to different properties of the content requested by the server 110. In an embodiment, in the case that the transmission of the content can not be interrupted, the sending device 603 needs to send the notification message before the user equipment 121 moves out of the target geographical location so that the server 110 can acquire the content in a timely way from another user equipment within the target geographical location. In an embodiment, in the case that the transmission of the content may be interrupted, the sending device 603 can send the notification message when the user equipment 121 is moving out of or after the user equipment 121 has moved out of the target geographical location. Of course, alternatively in this case, the user equipment 121 can send the notification message before moving out of the target geographical location.

It shall be noted that the operation processes of the server and the user equipment of the machine type communication based communication system have been detailed above from the functional perspective, and those ordinarily skilled in the art shall appreciate that the form of a physical carrier of the server will not be limited, for example, the server can be a base station or a wireless network controller or a computer; and the form of a physical carrier of the user equipment will not be limited either, for example, it can be a mobile phone, a personal computer, an on-vehicle device, a medical device, a camera on a road, etc.

It shall be noted that the foregoing embodiments are merely exemplary but not to limit the invention, and any technical solutions without departing from the spirit of the invention shall fall into the scope of the invention. Furthermore, any reference numerals in the claims shall not be construed as limiting the claims to which they relate; the term "comprising" shall not preclude other device(s) or step(s) which is(are) not listed in the claims or the description; "a" or "an" preceding a device shall not preclude presence of a plurality of such devices; in an apparatus including a plurality of devices, one or more functions of the plurality of devices can be performed by the same hardware or software module; and the terms "first", "second", "third", etc., are merely intended to represent a name but not to indicate any specific order.

The invention claimed is:

1. A method of accessing for a geographical location information-based service in a server of a machine type communication based communication system, the method comprising:
  (A) broadcasting or multicasting a content request message, the content request message comprising information on requested content and information indicating a target geographical location;
  (B) receiving a response message from at least one user equipment, the response message indicating that the at least one user equipment possesses the requested content, and the at least one user equipment being located within the target geographical location in the content request message; and
  (C) acquiring the requested content from the at least one user equipment;
  wherein acquiring the requested content comprises:
  acquiring the requested content by establishing a connection with the at least one user equipment; and
  wherein after (C), the method further comprises:
  receiving a notification message from the selected at least one user equipment, the notification message notifying the server that the selected at least one user equipment has moved out of the target geographical location;
  releasing the connection with the at least one user equipment; and
  repeating A, B and C.

2. The method according to claim 1, wherein before acquiring the requested content, the method further comprises:
  selecting at least one user equipment from the at least one user equipment based upon a predetermined rule; and
  wherein acquiring and requesting content further comprises:
  acquiring the requested content from the selected at least one user equipment.

3. The method according to claim 1, wherein before broadcasting or multicasting the content request message, the method further comprises:
  receiving the content request message from a network device, the content request message comprising the information on the target geographical location and the information on the requested content; and wherein after C, the method further comprises:
sending the acquired content to the network device.

4. A method of accessing for a geographical location information-based service in a user equipment of a machine type communication based communication system, the method comprising:
  (I) receiving a content request message from a server, the content request message comprising information on requested content and is information indicating a target geographical location;
  (II) determining whether the user equipment is located within the target geographical location in the content request message and determining whether the user equipment possesses the requested content; and
  (III) sending a response message to the server, when the user equipment is located within the target geographical location and possesses the requested content, the response message comprising information indicating that the user equipment possesses the content requested by the server;
  (IV) transmitting the requested content to the server once a connection between the user equipment and the server is established; and
  sending a notification message to the server, when the user equipment has moved out of the target geographical location before the transmission of the requested content is completed, the notification message notifying the server that the user equipment has moved out of the target geographical location.

5. The method according to claim 4, wherein the response message further comprises information indicating GPS coordinates of the geographical location where the user equipment is located.

6. The method according to claim 4, wherein transmitting the content comprises:
  transmitting the requested content to the server by establishing a connection with the server.

7. A first accessing apparatus for a geographical location information-based service in a server of a machine type communication based communication system, the apparatus comprising:
  a broadcasting or multicasting device, for broadcasting or multicasting a content request message, the content request message comprising information on requested content and information indicating a target geographical location;
  a first receiving device, for receiving a response message from at least one user equipment, the response message indicating that the at least one user equipment possesses the requested content, and the at least one user equipment being located within the target geographical location in the content request message;
  an acquiring device, for establishing a connection with the user equipment acquiring the requested content from the at least one user equipment using said connection; and
  receiving a notification message from the selected at least one user equipment, the notification message notifying the server that the selected at least one user equipment has moved out of the target geographical location; and
  wherein the first accessing apparatus further comprises:
  a control device, for controlling the broadcasting or multicasting device, the receiving device and the acquiring device to repeat the foregoing processes after the receiving device receives the notification message.

8. A second accessing apparatus for a geographical location information-based service in a user equipment of a machine type communication based communication system, the apparatus comprising:
  a second receiving device, for receiving a content request message from a server, the content request message comprising information on requested content and information indicating a target geographical location;
  a determining device, for determining whether the user equipment is located within the target geographical location in the content request message and determining whether the user equipment possesses the requested content;
  a sending device, for sending a response message to the server, if the user equipment is located within the target geographical location and possesses the requested content, the response message comprising information indicating that the user equipment possesses the content requested by the server; and
  a transmitting device, for transmitting the requested content to the server once a connection between the user equipment and the server is established; and
  sending a notification message to the server, if the user equipment has moved out of the target geographical location before the transmission of the requested content is completed, the notification message notifying the server that the user equipment has moved out of the target geographical location.

* * * * *